US010289222B2

(12) United States Patent
Mak et al.

(10) Patent No.: US 10,289,222 B2
(45) Date of Patent: May 14, 2019

(54) HANDLING OF TOUCH EVENTS IN A BROWSER ENVIRONMENT

(71) Applicant: BlackBerry Limited, Waterloo (CA)

(72) Inventors: Genevieve Elizabeth Mak, Toronto (CA); Eli Joshua Fidler, Toronto (CA); Michael Thomas Winkler, Hanover, PA (US); Matthew Nicholaos Staikos, Toronto (CA); Joseph Charles Mason, Montreal (CA)

(73) Assignee: BlackBerry Limited, Waterloo, Ontario (CA)

( * ) Notice: Subject to any disclaimer, the term of this patent is extended or adjusted under 35 U.S.C. 154(b) by 467 days.

(21) Appl. No.: 13/857,848

(22) Filed: Apr. 5, 2013

(65) Prior Publication Data

US 2013/0222244 A1 Aug. 29, 2013

Related U.S. Application Data

(63) Continuation of application No. 12/985,337, filed on Jan. 5, 2011, now Pat. No. 8,438,473.

(51) Int. Cl.
*G06F 3/041* (2006.01)
*G06F 3/0485* (2013.01)
*G06F 3/0488* (2013.01)

(52) U.S. Cl.
CPC .......... *G06F 3/041* (2013.01); *G06F 3/0485* (2013.01); *G06F 3/04883* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 7,072,984 B1 | 7/2006 | Polonsky et al. | |
| 7,146,564 B2 | 12/2006 | Kim et al. | |
| 7,325,188 B1 | 1/2008 | Covington et al. | |
| 7,703,009 B2 | 4/2010 | Huang et al. | |
| 7,783,497 B2 | 8/2010 | Dunnahoo et al. | |
| 7,818,681 B2 | 10/2010 | Abuelsaad et al. | |
| 8,209,606 B2 | 6/2012 | Ording | |
| 8,355,007 B2 * | 1/2013 | Kukulski | 345/173 |

(Continued)

FOREIGN PATENT DOCUMENTS

| | | |
|---|---|---|
| EP | 1630689 A1 | 3/2006 |
| WO | 2010076772 | 7/2010 |

OTHER PUBLICATIONS

Alimadhi, F., "Mobile Internet: Wireless access to Web-based interfaces of legacy simulations", Sep. 2002, Master of Science Thesis, University of Amsterdam, (96 pages).

(Continued)

*Primary Examiner* — Stephen S Hong
*Assistant Examiner* — Hope C Sheffield
(74) *Attorney, Agent, or Firm* — Fish & Richardson P.C.

(57) ABSTRACT

Handling of touch events in a browser environment is disclosed. An example method includes, while a document is displayed on a touchscreen display of a device, detecting a touch event at the touchscreen display, and selectively processing the detected touch event using one of a default handler, a touch event handler, and a conversion to one or more mouse events, according to a touch event handling property defined for the document.

19 Claims, 9 Drawing Sheets

(56) References Cited

U.S. PATENT DOCUMENTS

| | | | |
|---|---|---|---|
| 2002/0065955 A1* | 5/2002 | Gvily | G06F 17/22 719/330 |
| 2002/0078092 A1 | 6/2002 | Kim | |
| 2004/0025115 A1* | 2/2004 | Sienel | G06F 17/30896 715/234 |
| 2004/0261023 A1 | 12/2004 | Bier | |
| 2006/0059462 A1* | 3/2006 | Yamamoto | G06F 17/2247 717/115 |
| 2007/0168465 A1 | 7/2007 | Toppenberg et al. | |
| 2008/0042999 A1 | 2/2008 | Martin | |
| 2008/0139195 A1 | 6/2008 | Marsyla et al. | |
| 2008/0288402 A1 | 11/2008 | Drummond et al. | |
| 2009/0083589 A1 | 3/2009 | Fulton et al. | |
| 2009/0193356 A1 | 7/2009 | Saba | |
| 2009/0198567 A1 | 8/2009 | Dunnahoo et al. | |
| 2009/0225038 A1* | 9/2009 | Bolsinga et al. | 345/173 |
| 2009/0225039 A1 | 9/2009 | Williamson et al. | |
| 2010/0095197 A1 | 4/2010 | Klevenz et al. | |
| 2010/0283747 A1 | 11/2010 | Kukulski | |
| 2011/0028145 A1 | 2/2011 | Marsyla et al. | |
| 2011/0055021 A1 | 3/2011 | Haag | |
| 2011/0296057 A1* | 12/2011 | Shah | G06F 3/0488 710/14 |
| 2012/0151373 A1 | 6/2012 | Kominac et al. | |

OTHER PUBLICATIONS

Pestina, S., "Development Frameworks for Mobile/Wireless User Interfaces: A Comparative Study", Mar. 2002, Master of Science Thesis, Concordia University, (136 pages).

"Thethirdamigo", "Tracking Touch Events on the iPad", Feb. 12, 2010, retrieved Dec. 29, 2010 from http://htmlpad.wordpress.com/2010/02/12/tracking-touch-events-on-the-ipad/, (3 pages).

Cantrell, "Multitouch and gesture support on the Flash Platform", Nov. 17, 2009, retrieved Dec. 29, 2010 from http://www.adobe.com/devnet/flash/articles/multitouch_gestures.html, (11 pages).

3n, StackOverflow, "Disable the text-highlighting magnifier on touch-hold on Mobile Safari/Webkit", May 28, 2009, retrieved Dec. 29, 2010 from http://stackoverflow.com/questions/923782/disable-the-text-highlighting-magnifier-on-touch-hold-on-mobile-safari-webkit, (2 page).

Rakaz, "iPhone Webapps 101: Getting Safari out of the way", Sep. 14, 2009, retrieved Dec. 29, 2010 from http://rakaz.nl/2009/09/iphone-webapps-101-getting-safari-out-of-the-way.html, (7 pages).

Senchalabs, "JQTouch: CallbackEvents", retrieved Dec. 29, 2010 from https://github.com/senchalabs/jQTouch/wiki/callbackevents, (3 pages).

Apple Inc., "Safari DOM Additions Reference: User Experience", Nov. 15, 2010, (96 pages).

USPTO, "Office Action", issued in connection with U.S. Appl. No. 13/985,337, dated Aug. 17, 2012 (12 pages).

USPTO, "Notice of Allowance", issued in connection with U.S. Appl. No. 13/985,337, dated Jan. 10, 2013 (17 pages).

CIPO, CA Office Action relating to Application No. 2,763,349, dated Jun. 10, 2015.

Office Action issued in Canadian Application No. 2,763,349 dated May 6, 2016; 4 pages.

Office Action issued in Canadian Application No. 2,763,349 dated Jan. 29, 2018; 4 pages.

CA Office Action dated Apr. 3, 2017.

\* cited by examiner

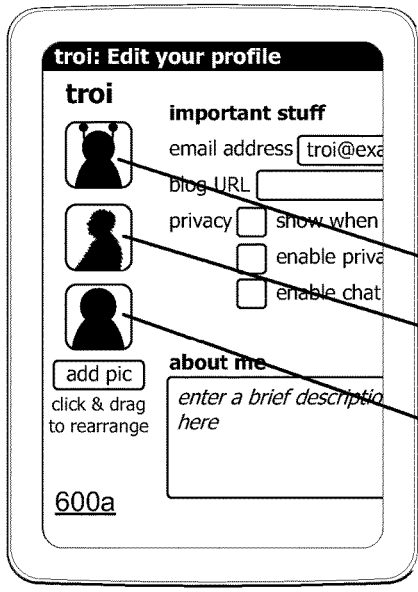
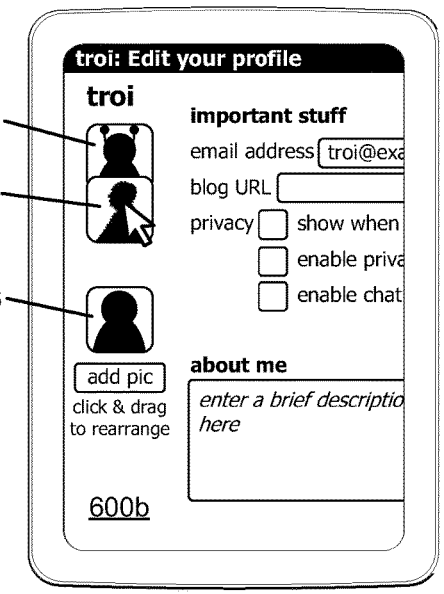
FIG. 6A  FIG. 6B
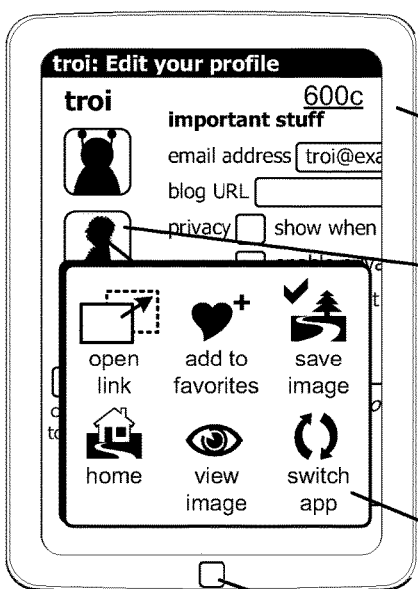
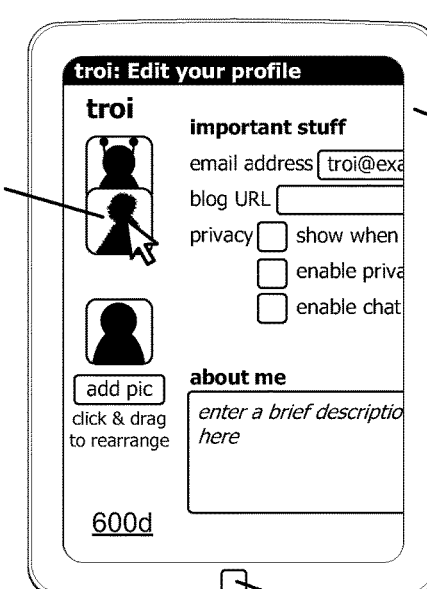
FIG. 6C  FIG. 6D

HANDLING OF TOUCH EVENTS IN A BROWSER ENVIRONMENT

BACKGROUND

1. Technical Field

The present application relates generally to the processing of detected user input events in a web browser.

2. Description of the Related Art

Computing devices such as desktop computers are typically equipped with external pointing devices, such as a mouse, to permit cursor-based user interaction with content executing on the computer. Users may interact with webpages, web applications and rich media applications using pointing devices and other user input mechanisms, such as keyboards. In mobile computing devices such as tablets and smartphones, however, it is not practical to provide external pointing devices. Rather, user input mechanisms are typically integrated into the mobile device's chassis, and often include touch-based input mechanisms such as trackpads, scroll balls, and optical joysticks for cursor-based control. An increasing number of mobile devices are now provided with touchscreen interfaces, which integrate the device's display with a touch-based input mechanism allowing the user to interact with displayed content more directly than with cursor-based control. Content developers may use user input in complex ways to create user-interaction heavy applications. However, the popularity of mobile devices has resulted in a number of different platforms (combinations of hardware and operating systems) and browser applications and environments for executing web applications and the like.

BRIEF DESCRIPTION OF THE DRAWINGS

In drawings which illustrate by way of example only embodiments of the present application.

FIGS. 6A and 6B are exemplary illustrations of different views of a webpage as it may be rendered in a desktop environment.

FIGS. 6C and 6D are further illustrations of the webpage of FIGS. 6A and 6B as it may be rendered on a touchscreen or mobile device.

DETAILED DESCRIPTION

Figure 1:
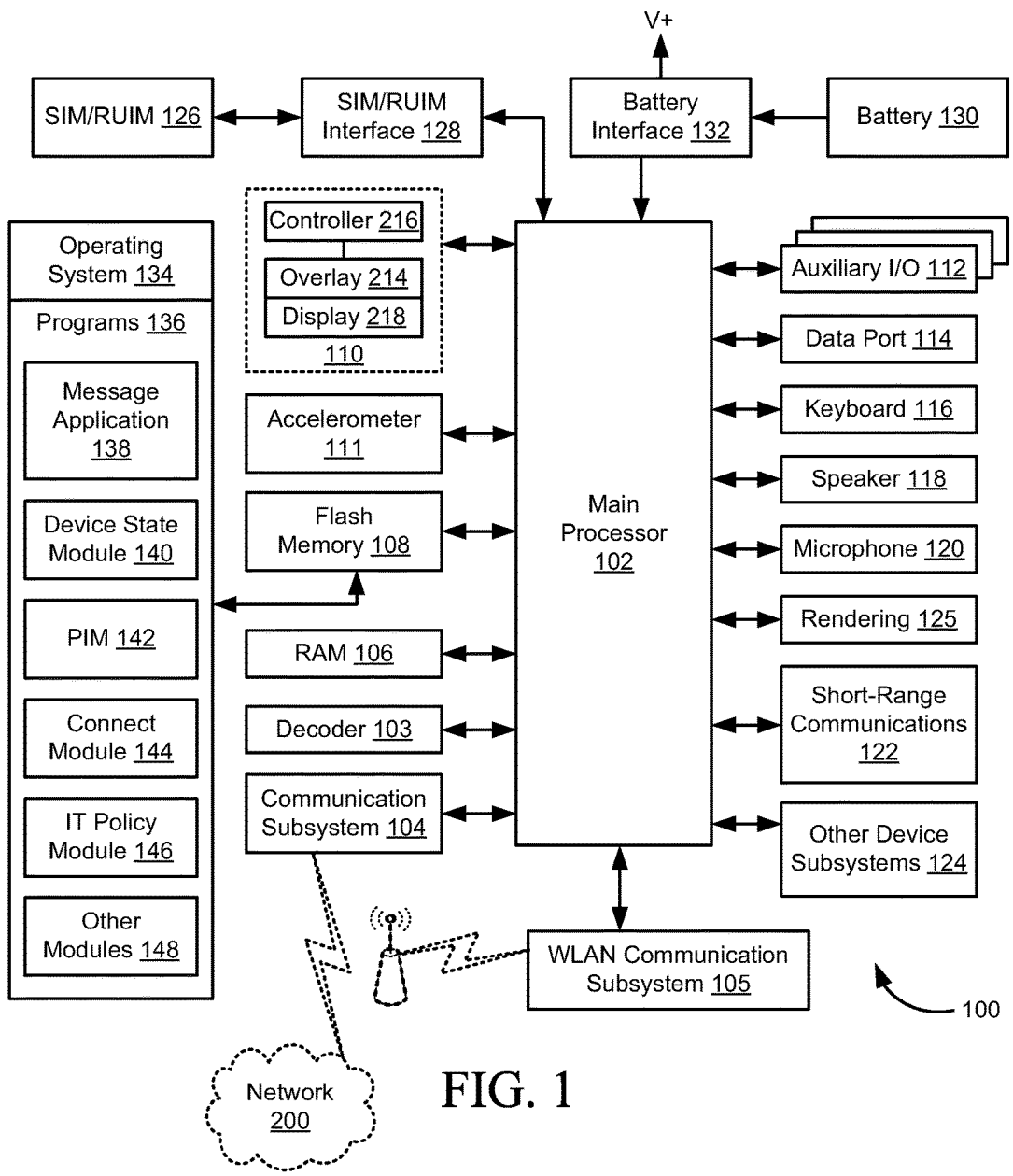
FIG. 1 is a block diagram of an embodiment of a computing device.

The embodiments described herein provide a system, method and apparatus for improved consistency in handling user input events such as cursor-based or touch (touchscreen) events on a computing device. In particular, properties defining modes for handling user events such as cursor events and touch events on a computing device such as a touchscreen device are provided. One property determines, for an entire webpage or for elements thereof, whether received cursor events should be processed in accordance with default handling routines configured in the browser environment, or passed for handling by an event handler defined for the element. Another property determines, for the entire webpage or elements thereof, whether received touch events should be processed in accordance with default handling routines, passed for handling by an event handler, or converted to cursor events or mouse events for handling by an event handler.

There is thus provided a method, comprising: detecting a first touch event associated with a webpage rendered for display in a browser environment, the browser environment implementing a plurality of functions for handling a set of touch events; when a first touch event handling property is defined for said webpage, the first touch event handling property defining a first plurality of touch events of the set of touch events for handling by a script provided for said webpage, executing said script to handle said first touch event when said first touch event is comprised in the first plurality of touch events; and when the first touch event handling property is not so defined, the browser environment handling the first touch event using one of the plurality of functions.

In one aspect, when a second touch event handling property is defined for said webpage, the second touch event handling property defining a second plurality of touch events of the set of touch events for handling by said script and defining a third plurality of touch events for conversion to a mouse event, said script is executed to handle said first touch event when said first touch event is comprised in the second plurality of touch events; and said first touch event is converted to a corresponding mouse event when said first touch event is comprised in the third plurality of touch events.

In another aspect, the first touch event handling property comprises a defined property set to a first value, and the second touch event handling property comprises the same defined property set to a second value.

In a further aspect, wherein the first plurality of touch events defined by the first touch event handling property comprises the entire set of touch events.

In still another aspect, the second plurality of touch events defined by the second touch event handling property comprises a subset of the first plurality of touch events.

These embodiments will be described and illustrated primarily in relation to computing devices such as communication devices that are adapted to communicate wirelessly various types of networks. It will be appreciated by those skilled in the art, however, that this description is not intended to limit the scope of the described embodiments to implementation on these particular systems or to wireless-enabled devices. For example, the embodiments described herein may be applied to any appropriate communication device or data processing device, whether or not it is adapted to communicate with another communication or data processing device over a fixed or wireless connection, whether portable or wirelessly enabled or not, whether provided with voice communication capabilities or not. The computing device can be adapted to process data and carry out operations on data in response to user commands for any number of purposes, including productivity and entertainment. Thus, the embodiments described herein may be implemented on computing devices adapted for content browsing, communication or messaging, including without limitation cellular phones, smartphones, wireless organizers, personal digital assistants, desktop computers, terminals, laptops, tablets, handheld wireless communication devices, notebook computers, ebook readers, entertainment devices such as MP3 or video players, and the like. Unless expressly stated, a computing or communication device may include any such device.

FIG. 1 is a block diagram of an exemplary embodiment of a computing device 100. The computing device 100 includes a number of components such as a main processor 102 that controls the overall operation of the computing device 100. Communication functions, including data and voice communications, are performed through a communication subsystem 104. Data received by the computing device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the computing device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the computing device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and UMTS, or fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems.

The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. As noted above, voice communication capabilities and connectivity to voice-centric networks is not mandatory for the operation of the computing device 100 with the within embodiments. Thus, the wireless communication subsystem 104 may be omitted. If so, optionally a dongle or other peripheral device (not shown) may be connected to the device 100 to provide the device 100 with access to the wireless network 200.

The main processor 102 also interacts with additional subsystems such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of the device 100.

In some embodiments, the user device 100 may comprise a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the device 100, although in some embodiments, additional buttons, variously shown in the figures or a trackpad, or other input means may be provided. In one embodiment, a transmissive TFT LCD screen 218 is overlaid with a clear touch sensor assembly 214 that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the device 100 to determine the location of the touch action, whether defined by horizontal and vertical screen position data or other position data. Touch location data may include an area of contact or a single point of contact, such as a point at or near a center of the area of contact. The touchscreen display interface 110 may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display 110.

Some of the subsystems of the computing device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The computing device 100 can send and receive communication signals over the wireless network 200 after required network registration or activation procedures have been completed. Network access is associated with a subscriber or user of the computing device 100. To identify a subscriber, the computing device 100 requires a SIM/RUIM/UICC card 126 (i.e. Subscriber Identity Module, Removable User Identity Module, Universal Integrated Circuit Card, or the like) or another suitable identity module to be inserted into a SIM/RUIM/UICC interface 128 in order to communicate with a network. The SIM/RUIM/UICC card 126 is one type of a conventional "smart card" that can be used to identify a subscriber of the computing device 100 and to personalize the computing device 100, among other things. Without the SIM/RUIM/UICC card 126, the computing device 100 is not fully operational for communication with the wireless network 200. By inserting the SIM/RUIM/UICC card 126 into the SIM/RUIM/UICC interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 126 includes a processor and memory for storing information. Once the SIM/RUIM/UICC card 126 is inserted into the SIM/RUIM/UICC interface 128, it is coupled to the main processor 102. In order to identify the subscriber, the SIM/RUIM/UICC card 126 can include some user parameters such as an International Mobile Subscriber Identity (IMSI). An advantage of using the SIM/RUIM/UICC card 126 is that a subscriber is not necessarily bound by any single physical mobile device. The SIM/RUIM/UICC card 126 can store additional subscriber information for a mobile device as well, including datebook (or calendar) information and recent call information. Alternatively, user identification information can also be programmed into the flash memory 108.

The computing device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the computing device 100. Although current technology makes use of a battery, future technologies such as micro fuel cells can provide the power to the computing device 100.

The computing device 100 also includes an operating system 134 and software components 136 to 152 which are described in more detail below. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 138 to 152, such as specific device applications, or parts thereof, can be temporarily loaded into a volatile store such as the RAM 106. Select other modules 152 may also be included, such as those described herein. Other software components can also be included, as is well known to those skilled in the art.

The subset of software applications 136 that control basic device operations, including data and voice communication applications, will normally be installed on the computing device 100 during its manufacture. Other software applications include a message application 138 that can be any suitable software program that allows a user of the computing device 100 to send and receive electronic messages. Various alternatives exist for the message application 138 as is well known to those skilled in the art. Messages that have been sent or received by the user are typically stored in the flash memory 108 of the computing device 100 or some other suitable storage element in the computing device 100. In at least some embodiments, some of the sent and received messages can be stored remotely from the device 100 such as in a data store of an associated host system with which the computing device 100 communicates.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the computing device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the computing device 100 with respect to such items. This can be particularly advantageous when the host computer system is the mobile device subscriber's office computer system. Some or all of the data items stored at the computing device 100 may be indexed for searching on the device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the device 100 that executes searches against all registered data repositories on the device based on received queries. The search engine can also be configured to invoke a search process of external resources, such as Internet search engines or remote databases.

The computing device 100 also includes a connect module 144, and an information technology (IT) policy module 146. The connect module 144 implements the communication protocols that are required for the computing device 100 to communicate with the wireless infrastructure and any host system, such as an enterprise system, with which the computing device 100 is authorized to interface.

The connect module 144 includes a set of Application Programming Interfaces (APIs) that can be integrated with the computing device 100 to allow the computing device 100 to use any number of services associated with the enterprise system or with other systems accessible over the network 200. The connect module 144 allows the computing device 100 to establish an end-to-end secure, authenticated communication pipe with the host system. A subset of applications for which access is provided by the connect module 144 can be used to pass IT policy commands from the host system to the computing device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the computing device 100, such as browsers 150, other user agents 148, and other modules 152. These software applications can be third party applications, which are added after the manufacture of the computing device 100. Other examples of third party applications include games, calculators, utilities, etc.

The additional applications can be loaded onto the computing device 100 through at least one of the wireless network 200, the auxiliary I/O subsystem 112, the data port 114, the short-range communications subsystem 122, or any other suitable device subsystem 124. This flexibility in application installation increases the functionality of the computing device 100 and can provide enhanced on-device functions, communication-related functions, or both. For example, secure communication applications can enable electronic commerce functions and other such financial transactions to be performed using the computing device 100.

The data port 114 enables a subscriber to set preferences through an external device or software application and extends the capabilities of the computing device 100 by providing for information or software downloads to the computing device 100 other than through a wireless communication network. The alternate download path can, for example, be used to load an encryption key onto the computing device 100 through a direct and thus reliable and trusted connection to provide secure device communication. The data port 114 can be any suitable port that enables data communication between the computing device 100 and another computing device. The data port 114 can be a serial or a parallel port. In some instances, the data port 114 can be a USB port that includes data lines for data transfer and a supply line that can provide a charging current to charge the battery 130 of the computing device 100.

The short-range communications subsystem 122 provides for communication between the computing device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the computing device 100 is substantially similar, except that the received signals are output to the speaker 118, and signals for transmission are generated by the microphone 120. Alternative voice or audio I/O subsystems, such as a voice message recording subsystem, can also be implemented on the computing device 100. Although voice or audio signal output is accomplished primarily through the speaker 118, the display 110 can also be used to provide additional information such as the identity of a calling party, duration of a voice call, or other voice call related information.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the wireless network 200 via an antenna. The DSP not only processes communication signals, but also provides for receiver and transmitter control, including control of gains applied to communication signals in the receiver and the transmitter. When the computing device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods. Other communication subsystems, such as the WLAN communication subsystem 105 or a WPAN communication subsystem, not shown, may be provided with similar components as those described above configured for communication over the appropriate frequencies and using the appropriate protocols. The particular design of the communication subsystem 104, 105, or other communication subsystem is dependent upon the communication network 200 with which the computing device 100 is intended to operate. Thus, it should be understood that the foregoing description serves only as one example.

Figure 2:
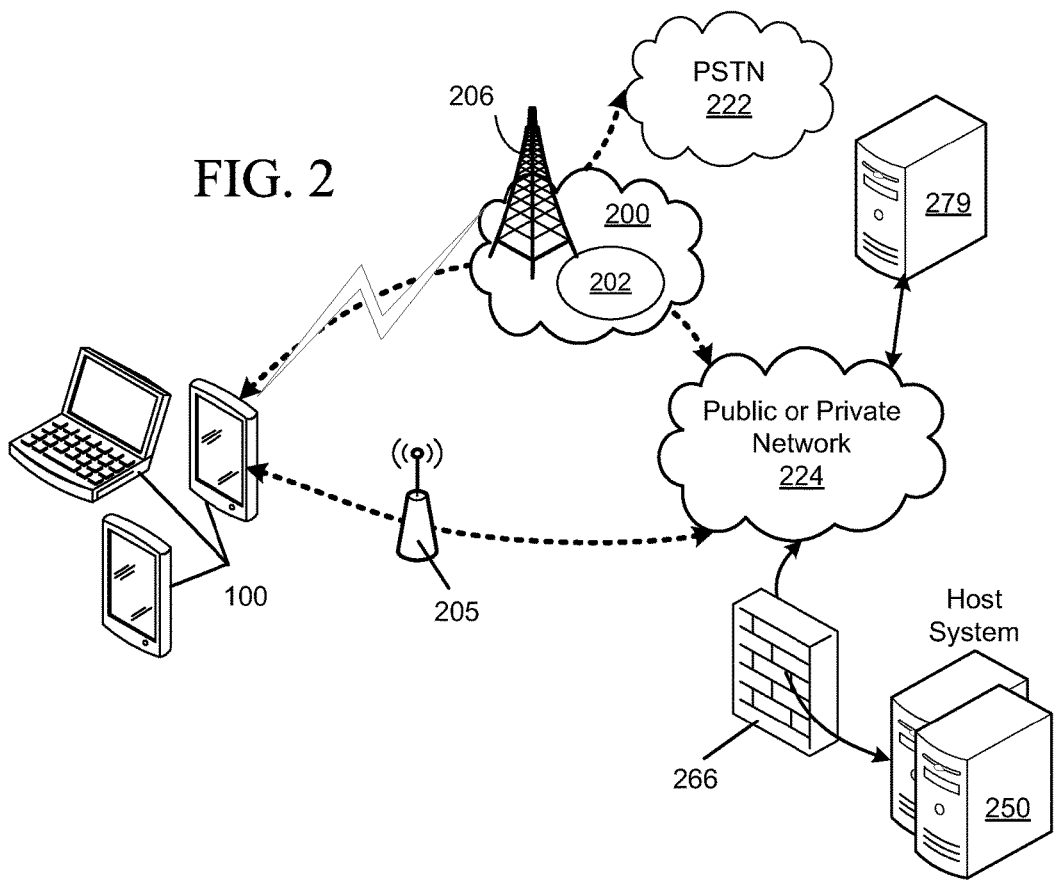
FIG. 2 is a schematic diagram of an exemplary network topology for use with the computing device of FIG. 1.

FIG. 2 illustrates a possible network topology for the computing device 100, including paths for data and voice traffic, and including a host or enterprise system 250. The host or enterprise system 250 will typically be a corporate enterprise or other local area network (LAN), but can also be a home office computer or some other private or quasi-private system, for example a subscription-based Internet service. Typically, a number of communication devices 100 can communicate wirelessly with the host or enterprise system 250 through one or more nodes 202 of the wireless network 200.

The host or enterprise system 250 comprises a number of network components, not shown, connected to each other by a network. Within the system 250, for example, user (including administrator) computers may be situated on a LAN connection, and one or more of these desktop computers can be provided with connection facilities for loading information (e.g. PIM data, private symmetric encryption keys to facilitate secure communications) from the user computer to the computing device 100, and can be particularly useful for bulk information updates often performed in initializing the computing device 100 for use. To facilitate the operation of the computing device 100 and the wireless communication of messages and message-related data between the computing device 100 and components of the host system 250, a number of wireless communication support components are provided within the system 250 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. HTTP servers can also be located outside the host or enterprise system, as indicated by the HTTP server 279 attached to the network 224. The mobile data server can also connect to the Internet or other public network through an enterprise HTTP server or other suitable web server such as a File Transfer Protocol (FTP) server, to retrieve webpages and other data. Requests for webpages are typically routed through mobile data server and then to the enterprise HTTP server, through suitable firewalls and other protective mechanisms. The web server then retrieves the webpage over the Internet, and returns it to mobile data server. The mobile data server is typically provided, or associated, with an encoder that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the computing device 100 via the shared network infrastructure 224 and the wireless network 200. Those skilled in the art know how to implement these various components. Other components can also be included as is well known to those skilled in the art.

The computing device 100's access to IP networks and to a public switched telephone network (PSTN), if applicable, can be provided through the wireless network 200, which comprises one or more nodes 202 configured for communication in accordance with a suitable mobile telephony standard. In turn, the wireless network 200 provides the computing device 100 with connectivity to the Internet or other public wide area network 224, and thence to the host or enterprise system 250. At the same time, if the computing device 100 is a multiple-mode device, it may also communicate with the host or enterprise system 250 over an enterprise LAN or WLAN, represented by the access point 205. It will be appreciated by those skilled in the art, however, that access to the host system 250 need not be limited to access via the enterprise network (whether wireless or not). Instead, the computing device 100 may access the host or enterprise system 250 over another network, such as the wide area IP network 224, via different access means, such as an access point located at the communication device user's home, or at a public or private Wi-Fi hotspot.

In this exemplary embodiment, the computing device 100 communicates with the host or enterprise system 250 through node 202 of the wireless network 200 and a shared network infrastructure 224 such as a service provider network or the public Internet. Access to the host or enterprise system can be provided through one or more routers (not shown), and computing devices of the host or enterprise system 250 can operate from behind a firewall or proxy server 266. A proxy server provides a secure node and a wireless internet gateway for the host or enterprise system 250. The proxy server intelligently routes data to the correct destination server within the host or enterprise system 250.

For some wireless networks 200 or LANs 205, the computing device 100 may be registered or activated with the respective network. A process for identifying a subscriber to a cellular network using a SIM or other identifier card 126 is described above. Other methods of registering or identifying the computing device 100 to various networks will be known to those of ordinary skill in the art. However, registration or activation may not be required for all wireless networks 200, LANs or WLANs, as some networks may allow access without prior registration or activation. The computing device 100 may also be provisioned or configured to access one or more networks. Methods of provisioning services on a computing device 100 will be generally known to those skilled in the art, but as a non-limiting example, a request for registration may be sent from the computing device 100 to a registration server of a service (not shown). If the request is approved, the registration server may transmit to the computing device 100 a service book or similar data item containing data and instructions to enable the computing device 100 to provision the service. The service book, when received at the computing device 100, may be self-executing, and permits the user to enter account information relevant to the associated service. This information is then transmitted from the computing device 100 to a provisioning server of the service provider (not shown), which then creates a service account associated with the computing device 100. Provisioning may also be carried out in compliance with the OMA DM (Open Mobile Alliance Device Management) specification version 1.2 or its predecessor or successor versions, published by the Open Mobile Alliance Ltd.

The embodiments herein will be described and illustrated primarily in relation to resources such as webpages, web applications, other rich media applications, and widgets; and to user agents such as browser applications (browsers). In particular, the resources and user agents described herein may conform to known standards for the structure and presentation of content, in particular HTML5, published by the World Wide Web Consortium (W3C) at w3.org. In addition, the within embodiments may comply with companion and predecessor standards and specifications, including without limitation HTML 4.01, XHTML 1.0 and 2.0, DOM Levels 1 through 3, and CSS Levels 1 through 3, also published by the World Wide Web Consortium (W3C) at w3.org. Resources may comprise or be associated with elements such as scripts written in JAVASCRIPT™ published by the MOZILLA™ Foundation, Mountain View, Calif., www.mozilla.org (trademark owned by Oracle Corporation, Redwood Shores, Calif.) or in other scripting languages designed to enable programmatic access to computational objects within a host environment; ADOBE™ FLASH™ and Flex technologies from ADOBE™ Systems Incorporated, San Jose, Calif.; video files in any one of various compatible formats, including FLASH™, QUICKTIME™, MPEG and in particular MPEG-4; dynamic HTML technology, widgets, modules, code snippets, and the like, which may be delivered together with the resource to the client device 100, or which alternatively may be downloadable separately by the client application, progressively downloaded, or streamed from the server for use with the resource.

The resources and user agents may be implemented using one or more of the foregoing technologies and other combinations of technologies. Further, the resources may be executed in browser, microbrowser and browser widget environments implemented using various known layout engines including, without limitation, WEBKIT™ (available at webkit.org), GECKO™ (MOZILLA™ Foundation), TRIDENT™ (Microsoft Corporation, Redmond, Wash.), PRESTO™ (Opera Software ASA, Oslo, Norway) and the like designed for various runtime environments including JAVA™ (Oracle Corporation, Redwood Shores Calif.), IOS™ (Apple Inc., Cupertino Calif.), WINDOWS™ (Microsoft Corporation) and BLACKBERRY™ and PLAYBOOK™ OS (Research In Motion Limited, Waterloo, Canada). Accordingly, the user agent or environment may be provided with one or more plug-in modules adapted for processing and rendering ancillary items, such as plug-ins for rendering FLASH™ content.

The relevant environment need not be restricted to a browser environment; for example, other runtime environments designed for implementation of rich media and Internet applications may be used, such as Adobe Integrated Runtime (AIR), also from Adobe Systems Incorporated. The selection and implementation of suitable existing and future structural or presentation standards, various elements, scripting or programming languages and their extensions, browser and runtime environments and the like, will be known to those of skill in the art.

Figure 3:
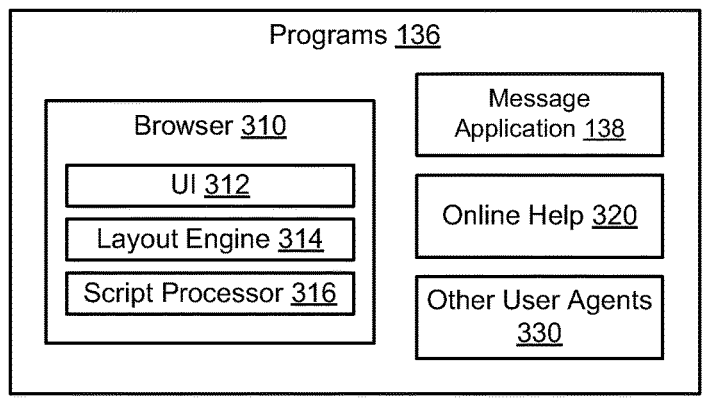
FIG. 3 is a block diagram of select modules implemented in the computing device of FIG. 1.

Select modules or components of the computing device 100 are illustrated in FIG. 3. The programs 136 may include, in addition to the message application 138 (also illustrated in FIG. 1), one or more browsers 310 and optionally other similar user agents 340 for use in rendering structured resources such as HTML documents and the like, as generally described above. An exemplary browser 310 may include a number of components or modules that interoperate to traverse, process and render the resource, including a user interface engine 312, a layout or rendering engine 314, and a script processor, plug-in, or virtual machine for executing code snippets, scripts and the like embedded in, received with, or invoked by the resource. The layout engine 314 may be invoked by other applications on the computing device 100. For example, the message application 138 may invoke an instance of the engine 314 to display an HTML-format email. Other files may be provided on or to the device 100 in a structured format, and similarly may be rendered in a browser-like environment; for example, "help" files may be presented by an online help application 320, which comprises a user interface engine but also invokes the layout engine 314 to render the files for display to the user. Other user agents 330 for presenting HTML and similar content may also be included on the device 100.

The computing device 100 may receive user input by means of one or more user input systems, such as a user input device or interface, including without limitation the keyboard 116, display 110 where the display is comprised in a touchscreen interface (referred to herein as a touchscreen display 110), microphone 120, trackball, buttons, trackpad, scroll wheel, optical joystick, rocker switch, and the like. Advantageously, the computing device 100 is provided with a touchscreen display 110. Several of these user input devices may be external to the computing device 100 itself; for example, a pointing device such as a mouse, trackball, tablet or touchpad may be provided as a peripheral component. In the case of a mobile device such as a smartphone or tablet computer, user input mechanisms are advantageously incorporated into the chassis of the computing device 100 itself for improved portability and mobility. For example, in a touchscreen computing device 100 such as a tablet or smartphone, the device 100 is provided not only with a touchscreen display 110, which may provide the main user input mechanism and permit alphanumeric data entry through display of an interactive virtual keyboard on the display 110, but also with one or more buttons, and/or an optical joystick or trackpad. These various user input devices and interfaces may be actuated by the user (for example, through the application of touch, pressure, and or directional movement) to control the operation of the computing device, for example to navigate through graphical user interfaces, menu structures, and the like, to select and initiate application or operating system commands for execution, to input data for processing or transmission by the computing device, or to change settings on the computing device.

While the majority of these user input mechanisms receive user input through user contact—primarily, manual manipulation—notionally these mechanisms may be considered as input mechanisms for detecting inputs either for cursor-based control or for touch-based control of the computing device 100. Cursor-based control, typically associated with pointing devices such as mice, permits the user to control the positioning of a cursor or other sprite displayed in a graphical user interface rendered on the display 110. When the cursor is positioned ("hovering") over a particular graphical user interface element, the input mechanism may be actuated (for example, by pressing a mouse button) to invoke a command associated with that element. Optical joysticks and trackpads may be used for cursor-based control. Touch-based control, typically associated with touchscreen displays 110, permits the user to more directly engage the graphical user interface elements displayed on the display 110 by touching or tapping the surface of the display 110 corresponding to that element. The touchscreen display 110 and its associated controller and processor 102 can be configured to also detect and identify gestures and multi-touch input (directional input and multiple concurrent touch input, respectively).

In a browser or other runtime environment such as those described above, user input detected (a user event) at one or more of the user input mechanisms provided on the device 100 may be passed to the processor 102 for determination of the type of detected input. In the case of directional input received from a pointing device or another cursor-based control mechanism such as a trackpad or optical joystick, the processor 102 receives raw data concerning the user event, such as an indication of the application of external force or contact, magnitude, directional, location, timing, and/or speed information, and determines from the raw data what type of user event occurred, such as a cursor event, mouse event or a touch event, which can include both gestures (comprising a series of touch events) and multitouch input (comprising a series of touch events, some of which may be concurrent) as well as single-touch inputs. In the case of a touch event, the touchscreen display controller 216 may process the raw data representative of the user input. The result of the processing of the processor 102 and/or controller 216 is passed to the current application, i.e. the application with corresponding to the active screen currently displayed at the device 100. Some resources use these user events in complex ways to create user-interaction heavy applications, such as games and Internet applications.

The taxonomy and models used to define user events will be known to those skilled in the art. For example, mouse event types of mousedown, mousemove, mouseout, mouseover, mouseup, and mousewheel and their interaction with webpages are defined in HTML5 or its predecessor specifications and correspond to the detected inputs of mouse button click, movement, mouse button release, and mouse scrollwheel movement. A possible interaction of webpages with lower-level touch events, which may include touchstart, touchmove, touchend, touchcancel, and their combination to define higher-level gesture events such as gesturestart, gesturechange, and gestureend, is defined in "Safari DOM Additions Reference: User Experience", published by Apple Inc., Cupertino, Calif. These models and types may be implemented in the layout engine 314.

In the case of a browser or similar application, when in receipt of the user event, the browser determines how the received user event is to be handled, and what screens (graphical user interfaces) should be displayed in response to the handled user event. Typically, the browser engine 314 is configured to invoke predefined functions to handle user events that may be implemented at least in part by the device operating system, for example through the invocation of an operating system API. Alternatively, predefined functions for handling user events may be implemented entirely within the browser itself, without the need for calls to the operating system. These predefined functions are typically called without reference to any event handlers or other instructions for handling user events provided for the webpage or other resource being rendered by the browser. As such, they may be considered to be the default actions or handling functions that are invoked by the browser when a particular user event is detected.

This default behaviour of the browser or other environment may be overridden or pre-empted by custom handling instructions provided with or in the webpage or other resources. For example, an event handler may be associated with target elements within the resource (which may include the entire page of the resource), such that when a user event having such an element as its target is detected, the user event is processed in accordance with the methods or scripts associated with the event handler rather than in accordance with the default action associated with that user event within the browser environment. The event handling function defined for the target element may programmatically prevent the firing of the default handling action, for example by invoking the preventDefault( ) method in JavaScript. The event handler may be associated with the target element in different ways, for example through XML attributes or a script identifying the target in accordance with the resource's DOM. The event handler may be directly assigned to the target element, or to an ancestor of the target element.

Given the prevalence of desktop computers and pointing devices such as mice in the home and office computing environments, unsurprisingly many webpages and other resources have been written to consume mouse events, and the detection and handling of mouse events is generally consistent across platforms (combinations of computing hardware and operating systems) and browsers. For example, in a browser environment, a mouse right-click on a displayed webpage expectedly invokes a context menu, the contents of which are determined by the webpage element receiving the right-click. In the desktop computing environment, conventionally resources are rendered for display on comparatively large monitors, and interaction with the resource is generally carried out using a pointing device such as a mouse. However, these existing webpages or resources may not port seamlessly to mobile devices, inasmuch as mobile computing devices such as smartphones and tablets often lack mouse-type pointing devices, relying instead on other means of cursor-based control such as trackpads and optical joysticks, and on touchscreen display interfaces. In many cases there is no direct correlation between a mouse event (for which the webpage was written) and a touch event or gesture event (which is received by the mobile device rendering the webpage). Webpages that have been written to fire certain scripts upon detection of a mouse event may not function as desired in a mobile browsing environment when there is no mouse to invoke an event.

Thus, in some implementations of mobile browsers, select user events, such as cursor events invoked using trackpads and the like and touch events detected at touchscreen displays are automatically converted to a corresponding mouse event. For example, a single touch on a touchscreen display 100 (a touchstart) may be converted by the browser to a mousedown event, and so rather than implementing an event handler for the touch event, the browser assumes that the touch event is a mousedown event, and handles the event as a mousedown event. Conversion of a touch event by the browser may be carried out based on the availability of default handling actions implemented in the browser environment for such events. For example, upon detection of a touch event, the browser determines whether the event should trigger a default handling action within the operating system or the browser; if so, this default handling action is called. If there is no default handling action associated with that touch event, then it is determined whether the touch event should trigger an emulated cursor event, since some touch events may "resemble" a cursor event (e.g., tapping an element resembles a mouse click on an element). Thus, in response to the touch event, the browser in this case may generate a series of one or more mouse events corresponding to the touch event, and any event handlers defined for the resource for that element and set of mouse events. If there is no corresponding mouse event, then no mouse event is generated; rather, the browser will then invoke any event handling defined for the original touch event. Various schemes for correlating touch events to mouse events will be known to those skilled in the art.

In some cases this conversion is accurate and yields a desired result; in other cases, however, converting the touch event to a mouse event in this manner may yield an unexpected and undesirable result because the desired user event (for example a touch event, as expected by the webpage) was not received by the browser, having been pre-empted by either a default handling action or by an unexpected conversion to a mouse event. Because of inconsistencies across platforms and browser engines in the mobile environment, webpage and web application developers must enable or disable specific features for each browser engine type, and optionally write additional code to process user events in a manner that will appear consistent with the operation of the same page or application on a desktop computer. Figuring out which features to enable or disable, and porting a page or application to each possible platform and engine, is time consuming and potentially frustrating for developers.

Figure 4A:
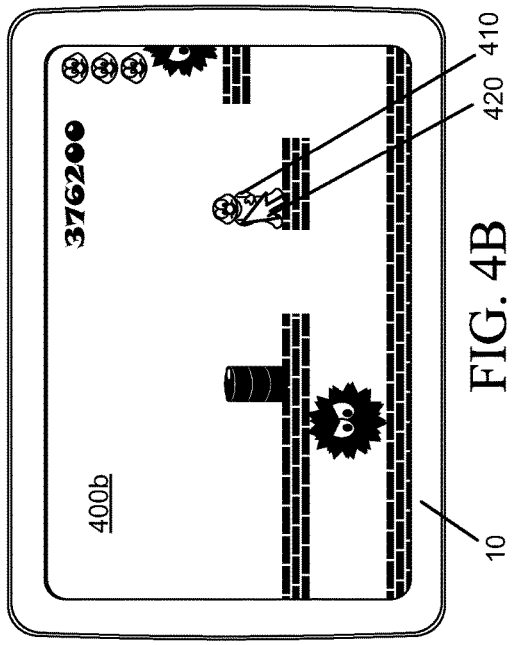
FIGS. 4A and 4B are exemplary illustrations of different views of a web application as it may be rendered in a desktop environment.
Figure 4B:
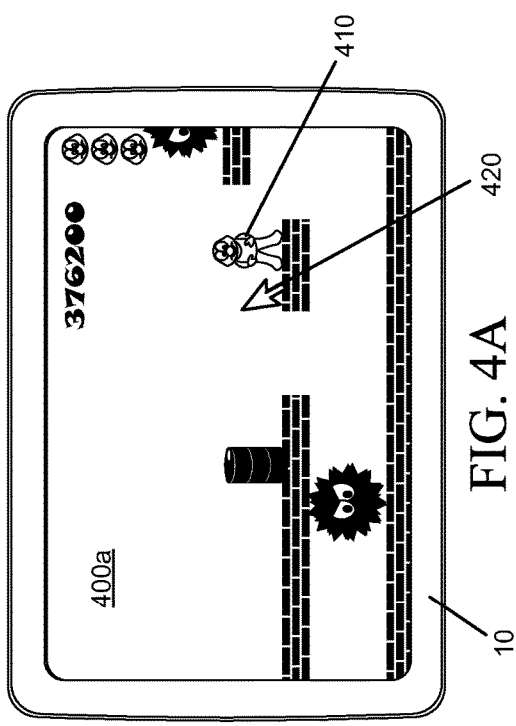
Figure 4C:
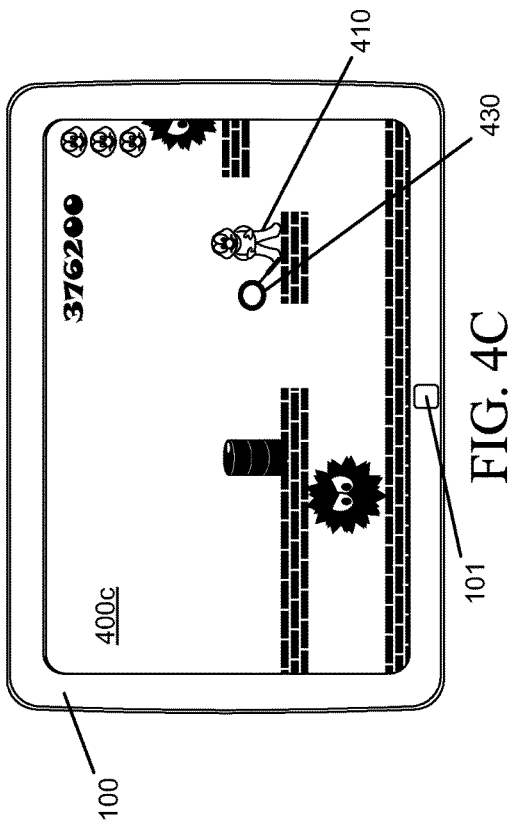
FIG. 4C is an exemplary illustration of the web application of FIGS. 4A and 4B displayed on a touchscreen or mobile device.

The difficulties in handling user events in a touchscreen environment may be observed more clearly in FIGS. 4A through C. These figures illustrate a platform game written as a web application, for example using functions and extensions available in the HTML5 specification, such as animation. In FIG. 4A, the web application is displayed at a computing device that is configured to receive input from a pointing device such as a mouse. In FIG. 4A, a first view 400a of the web application is shown, in which an animation object, the character 410, is stationary on the display. In this application, the character 410 may be moved to a different location on the screen 10 by the user positioning the cursor 420 (as it is moved using the user input mechanism, in this case a mouse) to the desired destination, and clicking and holding the mouse button at the destination (a mousedown event) until the character 410 moves to that destination. The end result may be seen in the user interface 400b of FIG. 4B, in which the character 410 has been moved to the location of the cursor 420. In a conventional webpage written for desktop browsing environments, the function causing the character 410 to move location on the screen may be fired by a handler for the detected mousedown event, such as a script.

In a mobile environment, however, because of the relative size of the display 110 compared to the convention desktop display, the behaviour of the cursor may vary from the behaviour of the cursor and the mousedown event illustrated in FIGS. 4A and 4B. For example, in a mobile browsing environment, rather than a mouse, the cursor is moved instead by manipulating a trackpad or optical joystick 101, as shown in FIG. 4C. While the movement of the cursor on the mobile display may reflect the movement of the cursor in the examples of FIGS. 4A and 4B, its behaviour may vary from the desktop environment. For example, the cursor shape and the function that is called by the mobile browser may vary according to the element over which the cursor is positioned. As shown in the graphical user interface 400c illustrated in FIG. 4C, in a mobile browser environment the cursor may represent a "click to zoom" function when it is not positioned over text, an image, or a hyperlink. In the example of FIG. 4C, the cursor 430 is shaped like a magnifying glass, indicative of a zoom or enlargement function. In the mobile browser, when the cursor is associated with this function and a "mousedown" event (a click of the trackpad 101) is detected, the mobile browser automatically handles the detected event by invoking a process to magnify the image of the webpage displayed in the display 100 and to redraw the screen 400c in a magnified view.

This default function is logical in the context of mobile browsing, since displays on mobile devices are often significantly smaller than desktop displays, so there is a greater need to zoom into content to enlarge it for viewing. However, in this example the default handling of the mousedown event is inconvenient, as the end result is to magnify the view 400c rather than cause the character 410 to move to the location of the cursor 430. In this example, there was no opportunity for the user event to be passed to any script associated with the web application for appropriate processing.

Accordingly, a new setting and process is provided to define a handling method for cursor-based user events that may otherwise receive different default treatment between a desktop and a mobile browsing environment. A new property is defined for the handling of cursor events by the browser. For ease of reference, this property is referenced as cursor-event-mode, although of course other property names may be used. In the following embodiments, it will be appreciated that the property names and attributes or values described herein are non-limiting, and any suitable name may be used for these entities.

The property cursor-event-mode may take on at least two values: a first value, processed, corresponds to a default state in which any detected cursor event is handled by the browser in a default mode. The default handling of the cursor event is typically, but not always, implemented at least in part in the computing device 100's operating system. For example, when the browser detects a new cursor event, it invokes an operating system API. The data passed to the operating system may simply comprise the cursor event, although typically the browser will have computed a response to the detected cursor event. As in the example of FIG. 4C, if the cursor event was the invocation of the zoom function, the browser may determine the content of a new, magnified view of the graphical user interface 400c. The browser may then push a new screen comprising the magnified view to the top of the operating system display stack so that the new screen is displayed at the device 100.

A second possible value for cursor-event-mode is native, which corresponds to a state in which select default handling functions for cursor events are disabled, and instead the cursor events are handled according to any code or scripts native to the webpage or other resource. In particular, the aforementioned "click to zoom" function is disabled.

By referring to a particular function as "disabled", it will be appreciated that the function may still be available in the browser environment for different webpages, applications and other resources, and indeed may still be available for select other elements in the displayed resource.

The cursor-event-mode property may be applied to an entire resource, for example in markup defining properties for a webpage. For example, the property may be set in a meta element within the header of an HTML document:

<meta name="cursor-event-mode" content="native">

The browser would then identify the property and its accompanying value when the resource is traversed and parsed for rendering. The cursor-event-mode property may also be applied to webpage or web application content in a manner analogous to existing CSS properties and element attributes, and interpreted by the browser or other environment in a manner similar to that currently used to apply other properties to various elements within a resource. For example, the property may be applied in a granular manner to any element type within the web document, and may be set within the webpage document itself, or alternatively in an associated CSS or other include file referenced by the webpage. Thus, for example, the property may be set for an arbitrary element (such as the anchor, <a>) or element class (e.g., "special_handling") as follows:

```
a, .special_handling {
cursor-event-mode: processed;
}
```

-continued

```
a, .special_handling {
cursor-event-mode: native;
}
```

Alternatively, the property may be sent for the entire <body> element of a web document, or for any other element. In a further embodiment, the cursor-event-mode property is defined for the entire page in its header in another designated element, or in a separate file referenced by the webpage.

The default value of cursor-event-mode may be processed; thus, if the property value is not expressly set, all cursor events will be handed in the default manner by the browser.

Figure 5A:
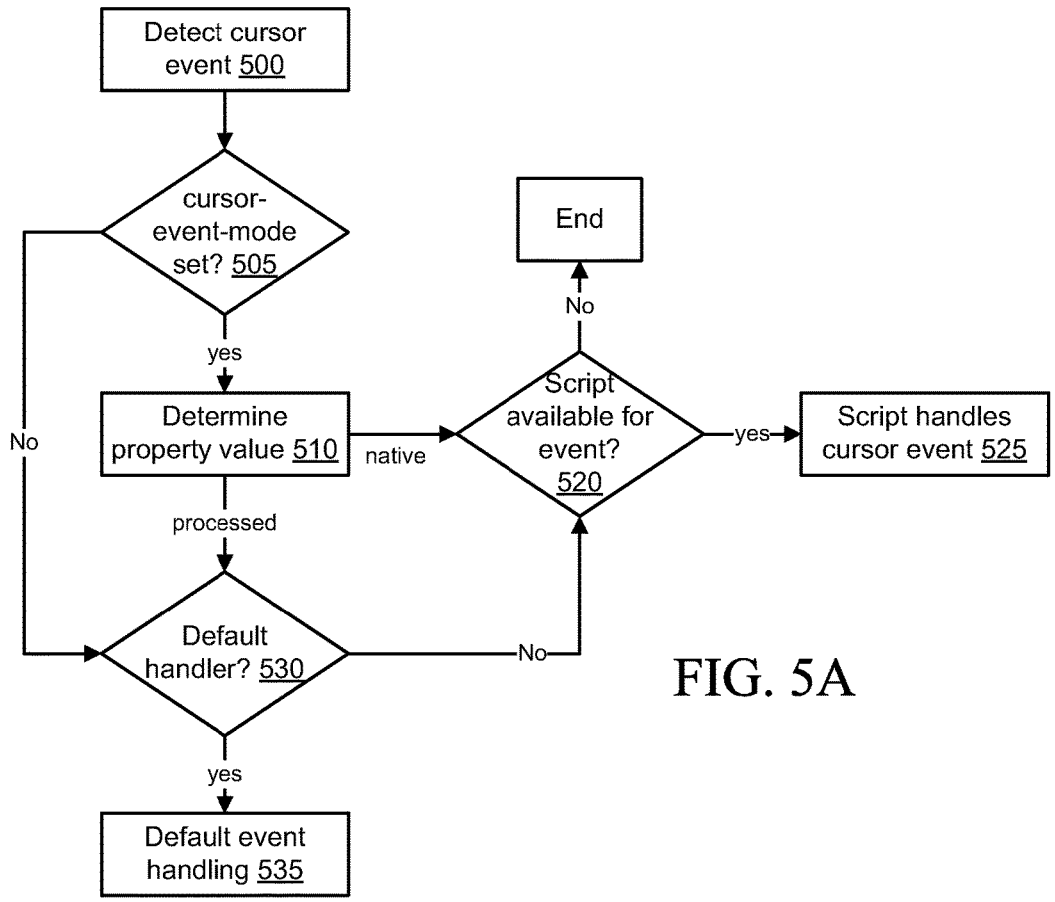
FIG. 5A is a flowchart illustrating a process for handling received cursor events on a computing device.

FIG. 5A illustrates a possible process to be followed by the browser or other runtime environment when a webpage is rendered for display, and a user cursor event is detected. A cursor event is detected at 500. At 505, a determination is made whether the cursor-event-mode is set. If it is not, then all cursor events are handled in the default mode, if a default handling function is available. Thus, at 530, a determination is made whether there is a default handling function available in the browser for handling the cursor event. If there is, the browser will invoke its default event handling routine for that event at 535, and will not invoke any handling processes defined within the webpage or resource itself (i.e., no JavaScript routines provided for the webpage to handle the cursor event will be invoked). If it is determined at 530 that there is no default event handling routine for that event, then it is determined whether there is a script or other webpage-defined event handler for the event at 520 (for example, it is determined whether the element to which the cursor event is applied identifies a cursor event handler). If there is not, then the process ends. If there is such a handler, then that script or other code is used to handle the event at 525.

If, however, it is determined at 505 that the cursor-event-mode is set, at 510 the value set for the property is determined. If the value is processed, then the process returns to 530. If the value is native, then at 520 it is determined whether there is a script or other code provided in or with the webpage for handling that event, as described above. If not, again the process ends, thus bypassing any possible default handling of the event. If there is, then the script handles the cursor event at 525.

Figure 5B:
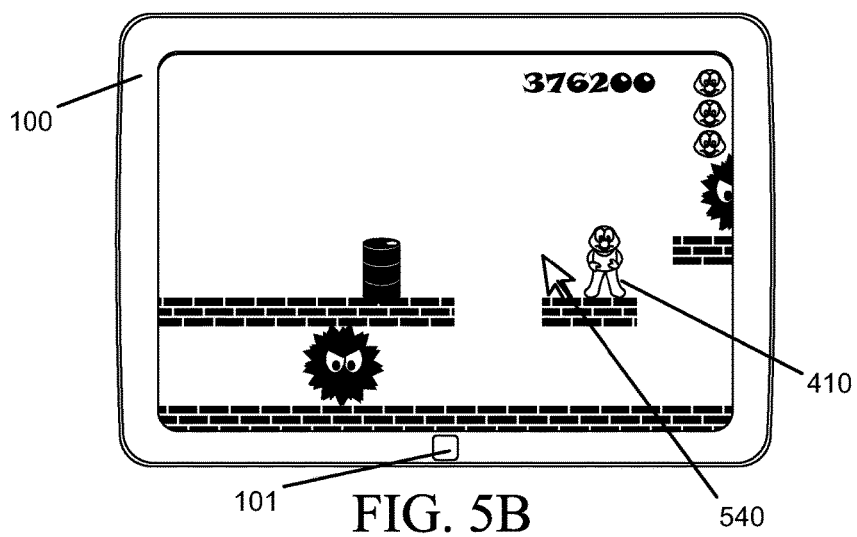
FIG. 5B is a further illustration of the web application of FIGS. 4A and 4B, displayed on a touchscreen device.

The result of the foregoing process is illustrated in FIG. 5B. Rather than the result of FIG. 4C, in which the "click to zoom" feature was activated as indicated by the magnifying glass cursor 430 as a result of cursor movement to that location of the screen, a pointer cursor 540 is shown in FIG. 5B, denoting that the "click to zoom" feature is disabled.

Other default functions for other cursor events may also be disabled by cursor-event-mode. FIGS. 6A through 6C illustrate a further example where the default handling of a cursor event generates an unexpected result. FIG. 6A illustrates a graphical user interface 600a including a number of graphic elements 502, 504, 506. In a desktop environment, a "drag and drop" function may be implemented to move individual elements, such as the graphic elements 502, 504, 506 from one place to another within the webpage. This function may be implemented in script such as JavaScript, or alternatively using the HTML5 drag and drop API. An element may effectively be clicked and dragged, while the mouse button remains depressed, to another position, and released, as shown in the graphical user interface 600b of FIG. 6B. The user events captured during the drag and drop transaction can include mousedown, mousemove, and mouseup (or the events of dragstart, drag, dragover, dragenter, dragleave, drop, and dragend as specified for HTML5 drag and drop). In the graphical user interface 600b, the first and third graphic elements 502, 506 remain in their original positions, but the second image 504 has been displaced. The expected behaviour in a desktop environment is, essentially, the well-known drag and drop functionality used in window-based graphical user interfaces.

However, on a touchscreen device such as the computing device 100 illustrated in FIG. 6C, the same cursor events may result in different behaviour. On select mobile platforms, a "click and hold" function (in which the cursor input device is clicked or otherwise actuated, and held in that position over a single element or position) may invoke a context menu, analogous to a context menu displayed in response to a mouse right-click in a desktop environment. Generally, the invocation of a context menu is also a default user event handling function that can be implemented at least in part using the computing device 100 operating system. In response to the detected "click and hold", the browser identifies the content actuated by the user event (i.e., the content or element positioned below the cursor at the time of the user event). Information about the content, such as the content type (<a> or <img> element, for example) is passed to the operating system, again for example via an API, and the operating system may then invoke a context menu (not shown) for display on the display 110.

Thus, in FIG. 6C, in response to the detected click and hold user event input via the trackpad or optical joystick 101 that is used to initiate the drag and drop process, a context menu 610 is invoked and displayed overlaying the user interface screen 600c instead. This behaviour is, of course, contrary to the expected drag and drop behaviour of FIG. 6B.

If, however, the property cursor-event-mode is set to native, as described above the browser determines that the detected user event (click and hold) is not to be handled in accordance with the default handling procedure; rather, the user event is to be handled in accordance with any event handler associated with the target of the user event as may be defined in association with the resource. For example, the detected event may be passed directly to any existing webpage script or other code for handling. In this manner, the context menu 610 is suppressed. The result may resemble the user interface 600d shown in FIG. 6D, in which the second image 604 is now dragged to a different position in response to click and hold and cursor move events.

It will be appreciated by those skilled in the art that select cursor events may remain unaffected even if cursor-event-mode is set to native, and will still be processed in accordance with any default handling action defined within the browser environment for that user event. An example of the possible effect of the native value on a set of user events is set out below:

TABLE 1

| Feature | Property | Value | Effect |
| --- | --- | --- | --- |
| click-to-zoom | cursor-event-mode | processed | clicking invokes zoom |
|  |  | native | clicking handled by script |
| click + hold | cursor-event-mode | processed | invoke context menu |
|  |  | native | click + hold handled by script |

TABLE 1-continued

| Feature | Property | Value | Effect |
|---|---|---|---|
| shift + trackpad swipe | cursor-event-mode | processed native | select text<br>shift + swipe handled by script |
| alt + trackpad swipe | cursor-event-mode | processed native | zoom in/out<br>alt + swipe handled by script |

When the property is set to native, the foregoing four features, which include the two discussed above as well as two cursor events for use in selecting text or zooming in or out of the displayed content, are no longer handled using the default action for that user event. It can be readily appreciated by those skilled in the art that the handling of other or additional cursor events, even if not expressly defined herein, may also be incorporated into one or both of the processed and native property settings.

In the embodiments set out above, the effect of the processed mode (i.e., the handling of user events using default actions) is to provide the user with access to functions dealing with the manipulation of the webpage, as it appears on the display of the device 100, or the copying or lifting of select content on the webpage, without necessarily interacting with the content of the webpage itself. In the native mode (i.e., those for which the default action is no longer taken), these default actions are pre-empted, and the functions enabled for the webpage can include functions that permit user interaction with the content of the webpage (through the interaction of scripts, for example, or other event handlers in response to clicks and other user events). Thus, defining the page using one of these modes provides the content developer with enhanced control over the rendering of the page by the browser.

Touch events may also be processed according to a property set for the webpage or other resource. Turning to FIGS. 7A through 7D, an example of a webpage or web application operating on a touchscreen device 100 is shown. In this example, the webpage or application is again a platform game, which extends beyond the device viewport (in this case, the entire area of the display 110). Thus, the screen 700a displayed in FIG. 7A constitutes only a portion of the entire webpage content.

Figure 7A:
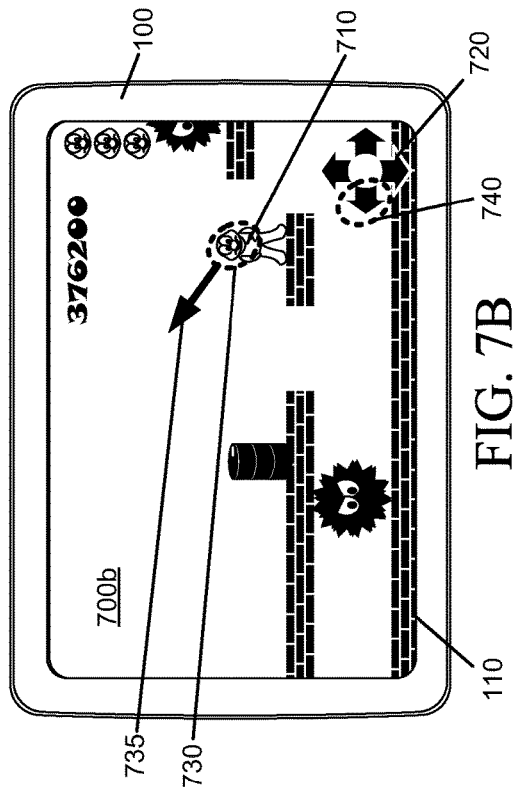
FIGS. 7A to 7D are further illustrations of the web application of FIGS. 4A and 4B as it may be rendered on a touchscreen device.
Figure 7B:
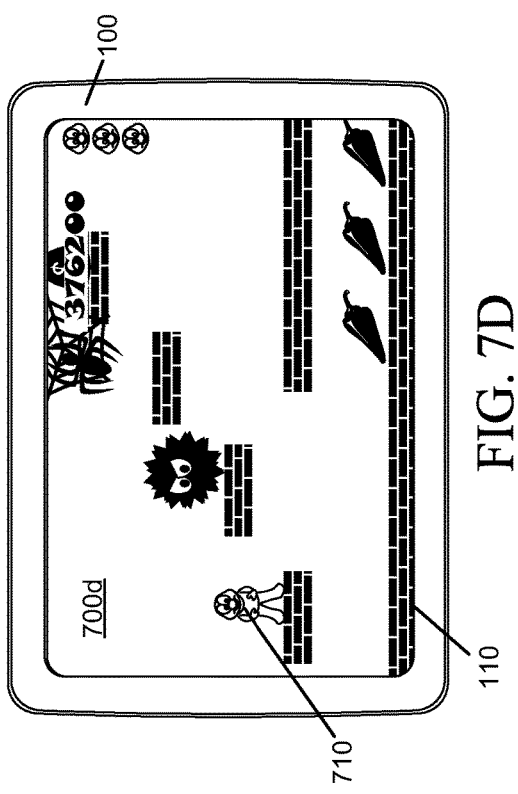

In a touchscreen environment, rather than using cursor-based input to control the execution of the resource, touchscreen-based controls are provided. In this example, touch events that are detected at designated regions of the touchscreen 110 are intended to be interpreted by the web application or webpage (or its associated scripts) as commands for directional movement. For example, navigation element 720 indicate regions (as identified by each arrow) where the user can touch and hold to move the character 710 in a corresponding direction. The resource may also be configured to process other touch events, such as a touch and swipe gesture applied to the character 710's current position. FIG. 7B illustrates a screen 700b in which possible touch event points are identified. A touch event may be detected on the left-hand arrow of the navigation element 720, as indicated by the dashed oval 740. The character 710 may move to the left of the display 110 for the duration of the touch event. Another touch event may be initiated at the character's current position, as indicated by the dashed oval 730. This touch may form part of a gesture event; touching and holding initially at the first position 730, then swiping in the direction of arrow 735, may cause the character to "jump" from its current position generally in the direction of arrow 735. The animation of the character in response to these various touch inputs (including characteristics such as acceleration and inertia) may be computed using functions defined in scripts or other code associated with the webpage, or alternatively by functions provided in the browser engine itself.

Figure 7C:
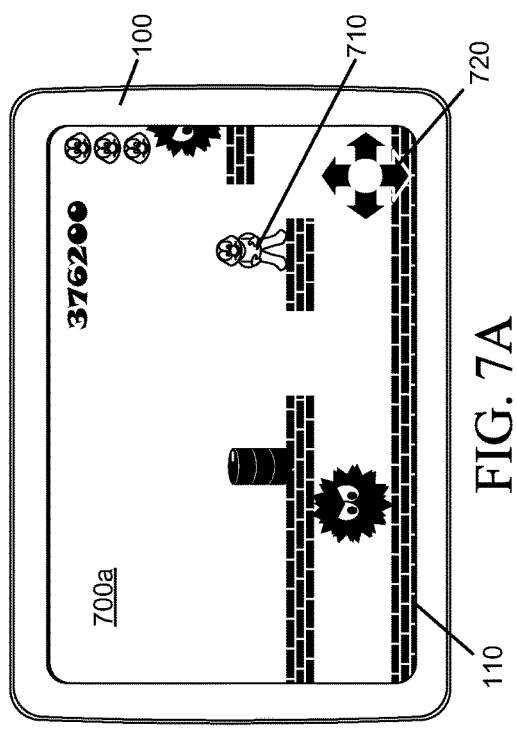
Figure 7D:
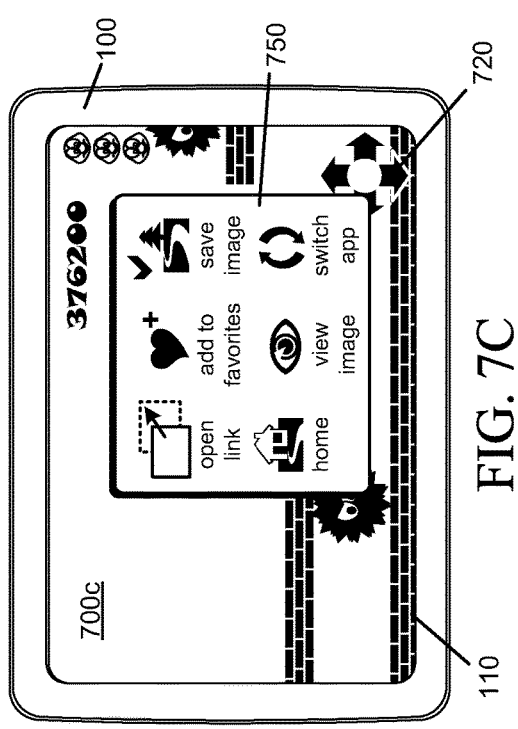

However, when the browser is configured with default handling functions for these touch events, the result may not be the character 710 movement that was expected. Again, touching and holding in a fixed position on the touchscreen 110 may invoke a context menu, generally as described above with respect to cursor events. FIG. 7C illustrates a further user interface screen 700c in which a context menu 750 has been invoked in response to the detected touch event at the position 740 in FIG. 7B. Further, a swipe gesture, such as that illustrated by position 730 and arrow 735 in FIG. 7B, may be interpreted by the browser as a scroll instruction, with the result that instead of animating the character 710, the webpage is scrolled in the direction of the gesture, as illustrated in FIG. 7D. The screen 700d in this indicates that the display 110 is now centered on another point of the webpage. This behaviour may be particularly undesirable in a game application, since panning or scrolling through the playing field is typically only carried out in response to the character 710's movement through the field.

While this unexpected behaviour might be addressable on a case-by-case basis, for example by providing scripts that prevent default actions from being called in response to user events, these scripts may not be portable across multiple platforms and browser environments. Accordingly, a further property, here referred to as touch-event-mode, is defined.

The property touch-event-mode may take a number of values. For example, a first value, processed, corresponds to a default state in which any detected touch event is handled by the browser in a default mode, such as in the examples described with respect to FIGS. 7A through 7D. As with the handling of cursor events, the default handling of the touch event may be implemented at least in part in the computing device 100's operating system, again for example by invoking an operating system API. For example, when the browser detects a new cursor event, it invokes an operating system API. The browser may then push a new screen comprising a new view of the webpage or other resource as a result of the default event handling. The default value of touch-event-mode may be set to processed; thus, if the property value is not expressly set, all touch events will be handed in the default manner by the browser.

A second possible value for touch-event-mode is native, which corresponds to a state in which default handling functions for touch events are disabled, and instead the touch events are handled according to any event handlers associated with the target element provided in the webpage or other resource. In particular, the aforementioned context menu and scrolling may be disabled. Effectively, all touch events are passed by the browser from the operating system for handling as defined by the resource (e.g. in accompanying JavaScript code or other scripts), without intervention by the browser to convert the touch events to mouse events, or to have the touch events handled in a default mode.

A third possible value for touch-event-mode is pure-with-mouse-conversion, in which select default handling functions for touch events are disabled, but other touch events are converted to mouse events. The effect of these property values is set out in the following table, which lists an exemplary set of features that may be implemented on a mobile touchscreen device platform. It will be appreciated by those skilled in the art, however, that additional features not listed below, or fewer features than those listed below, may be implemented on the platform:

TABLE 2

| Feature | Property | Value | Effect |
|---|---|---|---|
| double tap | touch-event-mode | processed | zoom in/out |
| | | native | double tap handled by script |
| | | pure-with-mouse-conversion | zoom in/out |
| touch + hold | touch-event-mode | processed | invoke context menu |
| | | native | touch + hold handled by script |
| | | pure-with-mouse-conversion | touch + hold handled by script |
| two-finger touch and hover | touch-event-mode | processed | select text between touches |
| | | native | touch handled by script |
| | | pure-with-mouse-conversion | touch handled by script |
| swipe | touch-event-mode | processed | scroll |
| | | native | swipe handled by script |
| | | pure-with-mouse-conversion | scroll |
| two-finger pinch/spread | touch-event-mode | processed | zoom out/in |
| | | native | pinch/spread handled by script |
| | | pure-with-mouse-conversion | zoom out/in |
| automatic target correction | touch-event-mode | processed | acquire predicted target based on touch |
| | | native | touch handled by script |
| | | pure-with-mouse-conversion | acquire predicted target based on touch |
| conversion of touch events to mouse events | touch-event-mode | processed | convert events |
| | | native | no conversion |
| | | pure-with-mouse-conversion | convert events |

As can be seen in the above table, when the property is set to processed, all touch events (double tap, touch and hold, two-finger touch and hover, swipe, and two-finger pinch and spread) are handled in the default mode, which results in a modification to the display of the rendered webpage or other resource; in the case of double tap, pinch or spread, the resource as displayed on the touchscreen is magnified or reduced in size, while in the case of a swipe, the resource is scrolled in the direction of the swipe. The two-finger touch and hover, which on select platforms results in a selection of a block of text or another element defined by the position of two fingers on the touchscreen display 110, highlights the selection for copying or other uses. Touch and hold, as described above, invokes a context menu that is populated based on the webpage element identified by the touch. Each of the above touch events, in the native mode, is passed directly to the webpage or other script for processing. The browser does not invoke its own default handling routines when touch-event-mode is set to native.

Optionally, other features may be disabled in the native mode, such as automatic target correction (also referred to as "fat finger correction"), in which the target element of a touch event is identified according to an algorithm provided in the browser. Further, to ensure that unadulterated touch events are passed to the webpage or script for processing, any default conversion of touch events to mouse events (for example, converting a touchdown event to a mousedown event) is also disabled. Thus, when touch-event-mode is set to native, a webpage or other resource written specifically to handle touch events (rather than cursor events) should execute as expected. By removing conversion to mouse events, scrolling and zooming and so on in the native mode, the need for the browser to execute synchronous events is reduced since that conversion or re-rendering of the webpage is not necessary. This is beneficial for the development of resources that make use of fast, repetitive and/or complex multitouch input, because the events are passed directly to the webpage or other script for processing without the browser intervening to have the events handled in the default mode. Further, in the native mode it will be clear which default handling routines for touch events are disabled (i.e., all of them).

In the third setting, pure-with-mouse-conversion mode, only select touch event default responses are disabled. In the embodiment described above, the touch and hold feature to display the context menu and two finger text selection are disabled, although in other implementations other responses may be disabled. Generally, however, all default responses defined for the browsing environment, save for actions used to permit the user to view or enhance the rendered content (for example, scrolling, zooming in, and zooming out), are disabled. When a touch and hold event or a two-finger selection is detected, those detected events are then passed to the webpage or other script for processing, and the default handling routine is bypassed. The remaining features remain enabled but also with conversion of select touch events to mouse events.

The enabled features in particular include those features that are typically used on a small touchscreen device for content perusal. For example, on a mobile touchscreen device, the display area of the touchscreen display 110 may be too small to display the entirety of a webpage, and what is displayed may be displayed at such as small scale as to be nearly illegible. It is therefore desirable in many cases to permit the user to scroll and to zoom in so that the user can peruse the content of the webpage. The disabled features such as touch and hold to invoke the context menu, however, are generally not needed for simply perusing content. The enabled features in the pure-with-mouse-conversion mode thus generally resemble the available features in a desktop browsing environment. By also enabling conversion of select touch events to mouse events, user experience interacting with the webpage or other resource will resemble the experience in the desktop environment, without requiring the developer of the resource to define specific handling rules for each possible touch event.

As with the cursor-event-mode property, the touch-event-mode property may be applied to webpage or web application content in a manner indicating its applicability to the entirety of the webpage or resource, for example by defining the property in a header tag (e.g., a meta element such as <meta name="touch-event-mode" content="processed">) or in a manner analogous to existing CSS properties and element attributes as discussed above (e.g., a, .special_handling {touch-event-mode: processed;}.

Figure 8A:
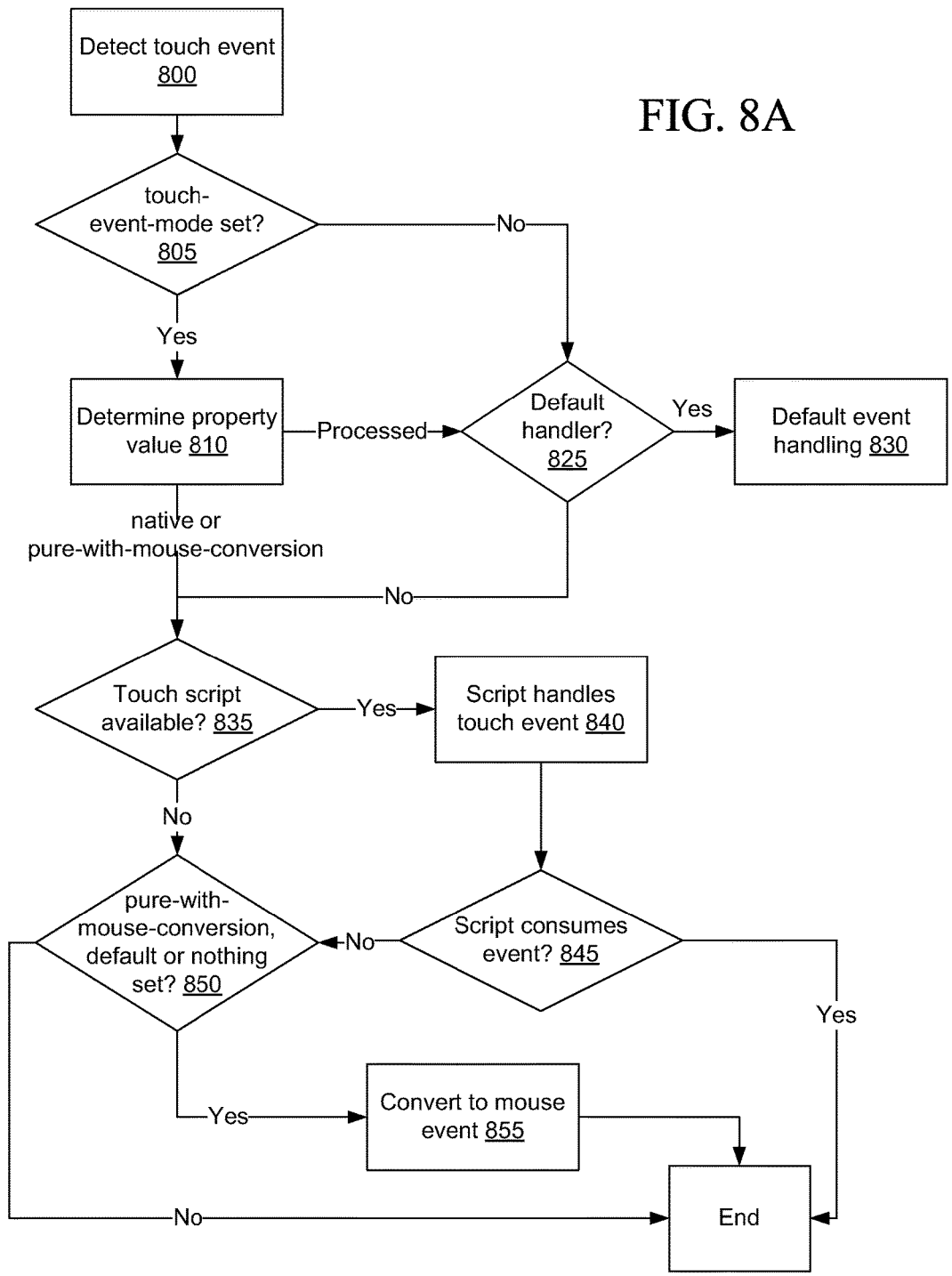
FIG. 8A is a flowchart illustrating a process for handling received touch events on a touchscreen device.

A method for implementing the touch-event-mode is illustrated in FIG. 8A. At 800, the touch event is detected. At 805 it is determined whether the touch-event-mode property is set; if it is not, then the touch event is to be handled in a default mode, so at 825 a determination is made whether there exists a default handler for the event. If a default handler exists, the event is handled in that manner at 830.

If there is no default handler when in the default mode, or if the touch-event-mode is set to native or pure-with-mouse-conversion, it is determined at 835 whether a script or other code provided for the webpage or other resource is available for handling the event as a touch event. If so, the event is passed to that script for handling at 840. At 845 it is determined whether the script has consumed the event. If the script has consumed the event (for example, if the event can no longer be propagated to other elements in the webpage), then the process ends.

If the event is not consumed, or if it is determined at 835 that there is no event handler for the touch event, it is determined at 850 whether the touch-event-mode is set to pure-with-mouse-conversion or the default mode (i.e., no express touch-event-mode setting). If it is not—i.e., the touch-event-mode is set to native—the process ends. Otherwise, for the pure-with-mouse-conversion and default modes, the touch event is converted to a mouse event or multiple mouse events at 855. The mouse event or events is then provided for event handling. Thus, in this process, both touch events and mouse events may be provided for event handling, although in alternative embodiments only one of touch events or mouse events is provided.

Figure 8B:
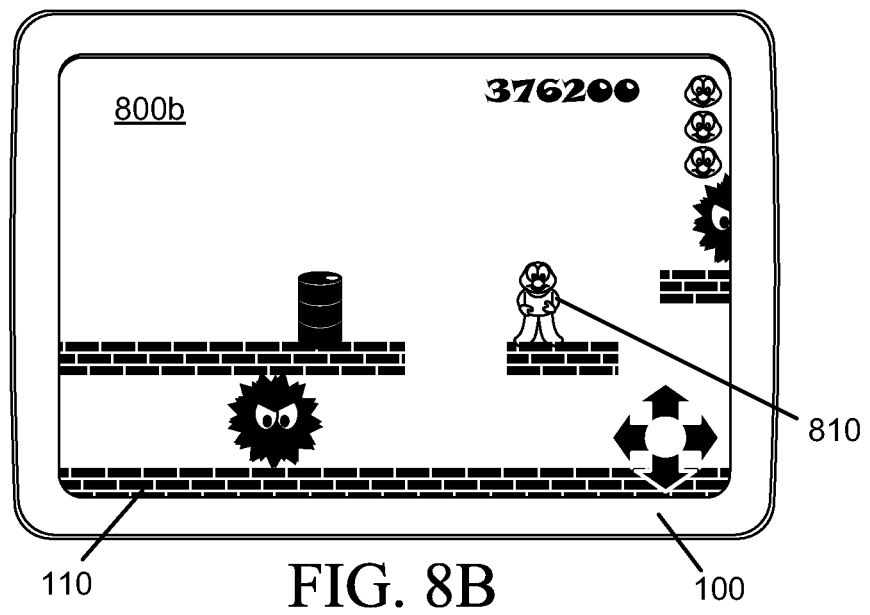
FIGS. 8B and 8C are further illustrations of the web application of FIGS. 7A to 7D as it may be rendered on a touchscreen device.
Figure 8C:
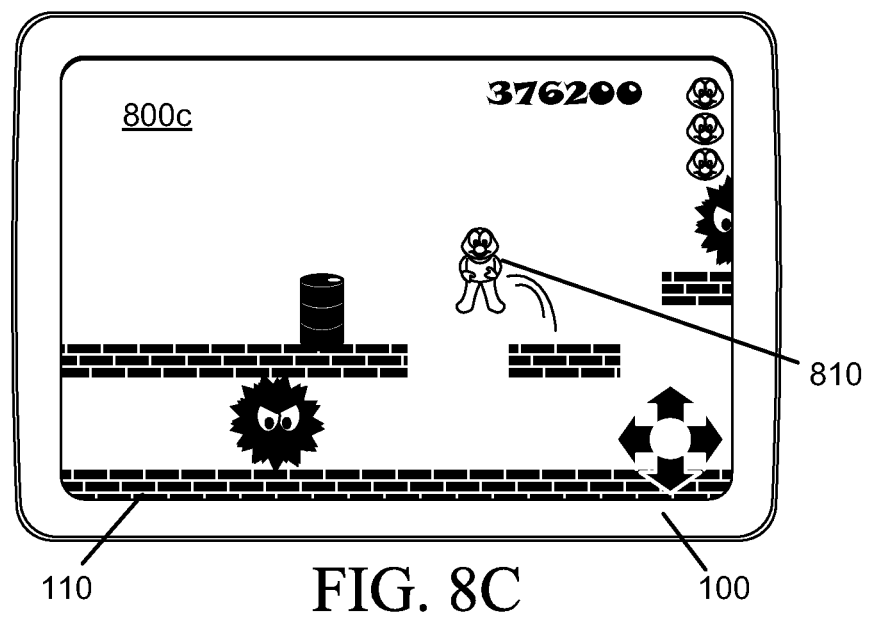

A result of the process of FIG. 8A may be seen in FIGS. 8B and 8C, which are further views 800b, 800c of the example of FIGS. 7A through 7D, when the touch-event-mode property is set to native. FIG. 8B is the result of the touch event of touch and hold illustrated in FIG. 7B at 740. Rather than invoking a context menu, which is disabled in these two modes, the touch event is passed to the webpage or web application for processing, and the result is movement of the character 810 to the left. FIG. 8C is the result of the touch event of a swipe gesture, as illustrated in FIG. 7B at 730, 735. Because default handling is disabled, the touch event is processed by the webpage or web application instead, and the result in this case is movement of the character 810 generally in the direction of the swipe. It may be noted that had touch-event-mode property been set to pure-with-mouse-conversion, the result of FIG. 8C would not have occurred; rather, the browser would still have scrolled the playing field in a manner similar to FIG. 7D because the swipe event would still have been handled in the default mode for the browser.

Figure 9A:
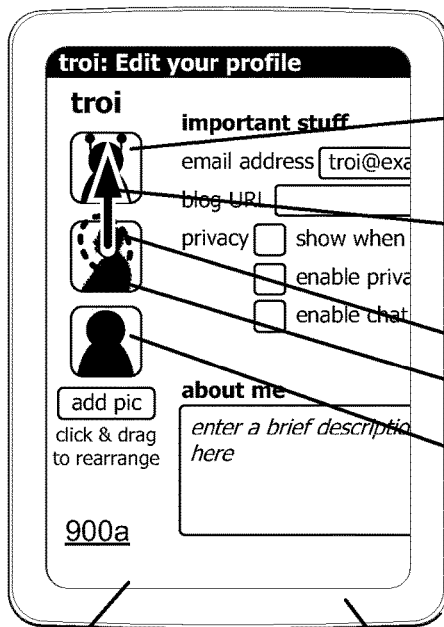
FIGS. 9A through 9C are further illustrations of the webpage of FIGS. 6A and 6B as they may be rendered on a touchscreen device.
Figure 9B:
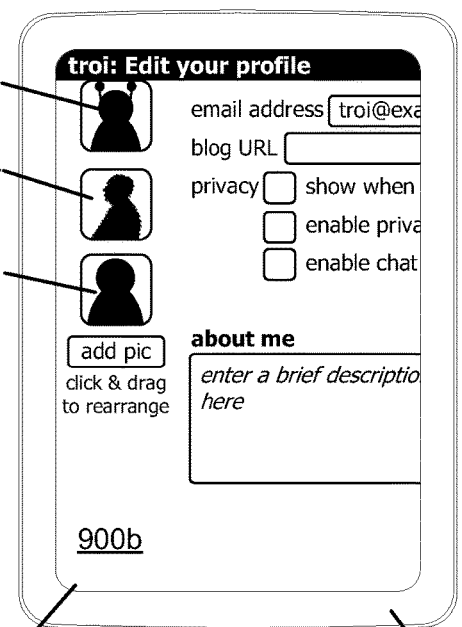
Figure 9C:
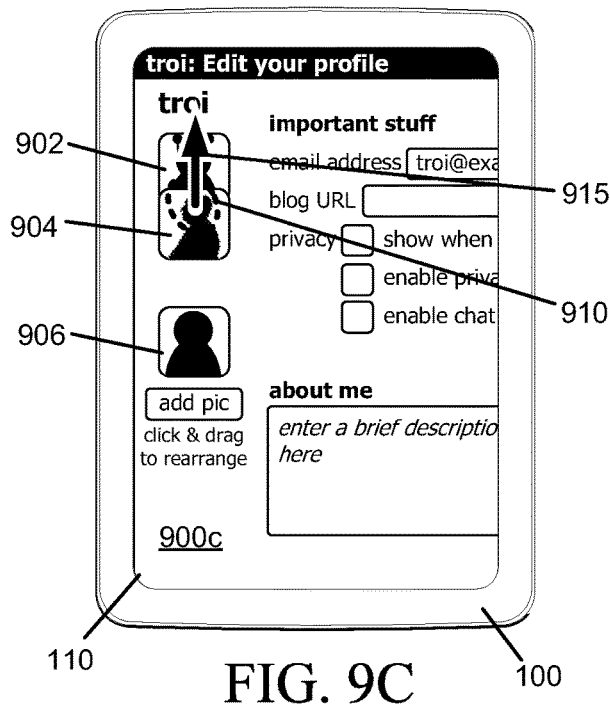

Finally, FIGS. 9A through 9C illustrate the effect of setting the touch-event-mode property for another webpage. The view 900a in FIG. 9A illustrates a webpage with multiple images 902, 904, 906, again implemented with scripts or other functions for dragging and dropping webpage elements (in this case the elements 902, 904, 906) to a different location on the page. In this case, the webpage is displayed on a touchscreen device 100, and the touch event illustrated is a swipe originating at the second image 904 (as indicated by the dashed oval 910), and moving in the direction of the arrow 915. If touch-event-mode is not set or is set to processed, the response will be similar to that illustrated in the screen 900b of FIG. 9B; rather than moving the individual image 904, the entire page is scrolled in the direction of the swipe. However, if the touch-event-mode property is set to native, then default handling of the touch event is disabled, and the touch event is passed directly to the webpage or accompanying script for processing. Thus, the result may be as illustrated in the screen 900c of FIG. 9C, in which the second image 904 is dragged in the direction of the arrow 915.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method, comprising:
    while a document is displayed on a touchscreen display of a device, detecting a touch event at a first location of the touchscreen display;
    identifying a touch event handling property defined in a document header of the document, wherein the touch event handling property is a meta element having a single value referencing a single event handler, wherein the single value is a first value or a second value, the first value referencing a default handler to the exclusion of other event handlers, the second value referencing a touch event handler to the exclusion of other event handlers, and wherein the meta element is applicable to the entirety of the document to identify the single event handler to use to process touch events detected at all portions of the displayed document that are responsive to touch events;

identifying the single event handler, wherein the single event handler is identified based on the identified touch event handling property; and processing the touch event at the first location using the identified single event handler, and wherein when the identified single event handler is the default handler, the detected touch event modifies the display of the displayed document, and wherein when the identified single event handler is the touch event handler, the detected touch event is sent to the document for processing.

2. The method of claim 1, wherein processing the detected touch event comprises:

when the touch event handling property defined for the document indicates that default handling functions are not permitted, and a touch event handler has been defined for the document, executing the touch event handler defined for the document to process the detected touch event.

3. The method of claim 2, wherein the detected touch event is associated with a target element within the document, the method further comprising, when the detected touch event can be propagated to a further element within the document after execution of the touch event handler:

converting the detected touch event to one or more mouse events and processing the one or more mouse events with a mouse event handler.

4. The method of claim 1, wherein processing the detected touch event comprises:

when the touch event handling property defined for the document indicates that default handling functions are permitted, executing the default handler to process the detected touch event.

5. The method of claim 1, wherein processing the detected touch event comprises:

when the touch event handling property defined for the document indicates that default handling functions are permitted but no default handler has been defined for the detected touch event, if a touch event handler defined for the document has been defined for processing the detected touch event, executing the touch event handler.

6. The method of claim 1, wherein processing the detected touch event comprises:

when the touch event handling property defined for the document indicates that at least one touch event is to be processed using a touch event handler and at least one other touch event is to be processed by conversion to one or more mouse events, if the touch event handler has been defined for processing the detected touch event, executing the touch event handler;

if no touch event handler has been defined for processing the detected touch event and the detected touch event is to be processed by conversion to one or more mouse events, converting the detected touch event to one or more mouse events and processing the one or more mouse events with a mouse event handler.

7. The method of claim 1, wherein the document comprises a webpage.

8. The method of claim 1, wherein the document is rendered for display by an application environment executing on the device, and the default handler is provided by the application environment.

9. The method of claim 1, wherein the touch event handler is comprised in the document.

10. An electronic device, including:

a touchscreen display configured to receive touch events; and a processor in communication with the touchscreen display interface, the processor being configured to:

while a document is displayed on a touchscreen display of a device, detect a touch event at a first location of the touchscreen display;

identify a touch event handling property defined in a document header of the document, wherein the touch event handling property is a meta element having a single value referencing a single event handler, wherein the single value is a first value or a second value, the first value referencing a default handler to the exclusion of other event handlers, the second value referencing a touch event handler to the exclusion of other event handlers, and wherein the meta element is applicable to the entirety of the document to identify the single event handler to use to process touch events detected at all portions of the displayed document that are responsive to touch events;

identify the single event handler, wherein the single event handler is identified based on the identified touch event handling property; and process the touch event at the first location using the identified single event handler, and wherein when the identified single event handler is the default handler, the detected touch event modifies the display of the displayed document, and wherein when the identified single event handler is the touch event handler, the detected touch event is sent to the document for processing.

11. The electronic device of claim 10, wherein process the detected touch event comprises:

when the touch event handling property defined for the document indicates that default handling functions are not permitted, and a touch event handler has been defined for the document, execute the touch event handler defined for the document to process the detected touch event.

12. The electronic device of claim 11, wherein the detected touch event is associated with a target element within the document, and the processor is further configured to, when the detected touch event can be propagated to a further element within the document after execution of the touch event handler:

convert the detected touch event to one or more mouse events and process the one or more mouse events with a mouse event handler.

13. The electronic device of claim 10, wherein process the detected touch event comprises:

when the touch event handling property defined for the document indicates that default handling functions are permitted, execute the default handler to process the detected touch event.

14. The electronic device of claim 10, wherein process the detected touch event comprises:

when the touch event handling property defined for the document indicates that default handling functions are permitted but no default handler has been defined for the detected touch event, if a touch event handler defined for the document has been defined for processing the detected touch event, execute the touch event handler.

15. The electronic device of claim 10, wherein process the detected touch event comprises:

when the touch event handling property defined for the document indicates that at least one touch event is to be processed using a touch event handler and at least one other touch event is to be processed by conversion to one or more mouse events, if the touch event handler has been defined for processing the detected touch event, execute the touch event handler;

if no touch event handler has been defined for processing the detected touch event and the detected touch event is to be processed by conversion to one or more mouse events, convert the detected touch event to one or more mouse events and processing the one or more mouse events with the mouse event handler.

16. The electronic device of claim 10, wherein the document comprises a webpage.

17. The electronic device of claim 10, wherein processor is further configured to execute an application environment to render the document for display, and the default handler is provided by the application environment.

18. The electronic device of claim 10, wherein the touch event handler is comprised in the document.

19. A non-transitory device-readable medium storing code which, when executed by one or more processors of an electronic device, cause the electronic device to:

while a document is displayed on a touchscreen display of the electronic device, detect a touch event at a first location of the touchscreen display;

identify a touch event handling property defined in a document header of the document, wherein the touch event handling property is a meta element having a single value referencing a single event handler, wherein the single value is a first value or a second value, the first value referencing a default handler to the exclusion of other event handlers, the second value referencing a touch event handler to the exclusion of other event handlers, and wherein the meta element is applicable to the entirety of the document to identify the single event handler to use to process touch events detected at all portions of the displayed document that are responsive to touch events;

identify the single event handler, wherein the single event handler is identified based on the identified touch event handling property; and process the touch event at the first location using the identified single event handler, and wherein when the identified single event handler is the default handler, the detected touch event modifies the display of the displayed document, and wherein when the identified single event handler is the touch event handler, the detected touch event is sent to the document for processing.

* * * * *